(No Model.)
P. GENDRON.
MACHINE FOR BENDING CRANK AXLES.
No. 499,020. Patented June 6, 1893.
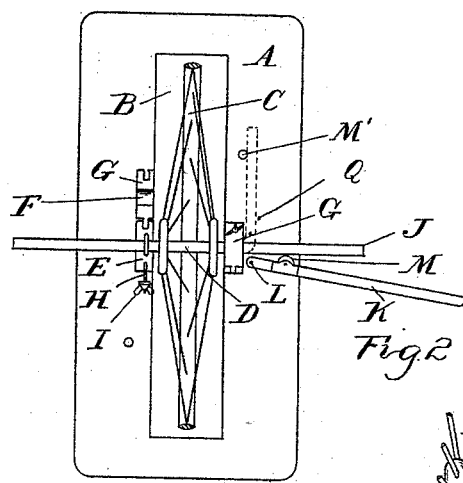
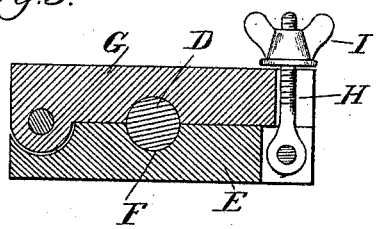
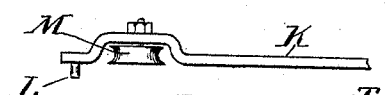
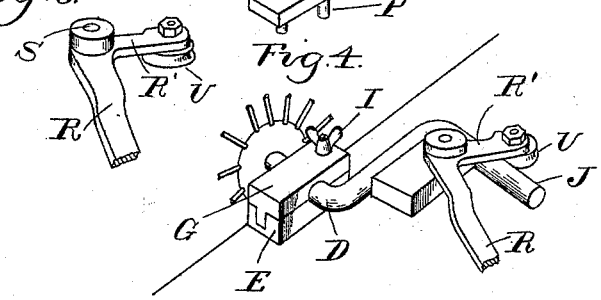
Witnesses
A. L. Hobbie
Th. B. O'Dogherty
Inventor
Peter Gendron
By Thos. Sprague & Son
Attys.

UNITED STATES PATENT OFFICE.

PETER GENDRON, OF TOLEDO, OHIO.

MACHINE FOR BENDING CRANK-AXLES.

SPECIFICATION forming part of Letters Patent No. 499,020, dated June 6, 1893.

Application filed February 11, 1893. Serial No. 461,916. (No model.)

*To all whom it may concern:*

Be it known that I, PETER GENDRON, a citizen of the United States, residing at Toledo, in the county of Lucas and State of Ohio, have invented certain new and useful Improvements in Machines for Bending Crank-Axles, of which the following is a specification, reference being had therein to the accompanying drawings.

The invention consists in the peculiar construction of a base having a clamp or clamps thereon to bind the axle in position, a lever for bending the axle upon the box or clamp, a detachable form or block adapted to be secured to the base intermediate of the bent portion and a second lever for bending the arm to form the crank.

The invention further consists in the peculiar construction, arrangement and combination of the various parts, all as more fully hereinafter described.

In the drawings, Figure 1 is a plan view of my improved machine showing a wheel with a straight shaft therein, which is adapted to be bent to form a crank shaft. Fig. 2 is an enlarged plan showing one crank only with a second lever in position for bending the crank arm around the detachable block or die. Fig. 3 is a cross section on line *x x* in Fig. 2. Fig. 4 is a detached perspective view of the parts shown in Fig. 2. Fig. 5 is a side elevation of one of the bending levers. Fig. 6 is a perspective view of the other bending lever. Fig. 7 is a detached perspective view of the forming block about which the crank is bent.

A is a base preferably of metal and supported upon suitable legs or standards. This base is preferably provided with a central aperture B of a size to allow of a wheel C to freely enter therein. This wheel is designed for a velocipede crank axle or drive wheel and is provided with a shaft D extending to both sides of the hub thereof.

E are blocks secured at each side of the aperture B and having suitable bearings F in which the shaft D is adapted to engage.

G are clamping levers pivoted at one end of the block and having complementary half bearing to engage the upper half of the shaft D, and suitable means such as the screw bolt H and winged nut I for clamping the lever upon the shaft to tightly hold it in position.

When thus secured the ends J of the shaft are bent upon the clamp or block E by means of a lever K which at its inner end is provided with a pin L, engaging an aperture in the base, also provided with a grooved roller M adapted to bear against the side of the shaft as the lever is turned upon its pivot L. The operator taking hold of the lever draws it against the extension J of the shaft and turns it until the shaft strikes a stop M' on the base, as shown in dotted lines in Fig. 1. The operator now places a forming block intermediate the ends of the bent portion of the shaft. This block is provided with suitable pins P on its under side engaging in apertures Q in the base. In this position the crank is formed by employing a lever R having an off-set arm R' at its end. This arm is provided at its end with an aperture S adapted to engage over the pin T extending from the parallel face of the block O. It is also provided with a roller U depending below the lever and adapted to engage with the end of the bent portion of the shaft. The parts being in the position shown in Fig. 2, the operator draws upon the outer end of the lever, bending the end of the shaft around the end of the forming block, as shown in Fig. 4. The block O and the clamping levers G may now be removed and the wheel is ready for use, as soon as the proper pedals are attached, as a velocipede drive wheel.

I preferably arrange similar devices at both sides of the wheel, so that both cranks may be formed simultaneously.

While I have shown the device applied for bending a shaft upon which the wheel was centrally secured, it is evident that it may be also used in connection with the shaft which has not the wheel secured thereon.

What I claim as my invention is—

1. In a machine for bending crank axles, the combination with a base and a fixed forming clamp for the axle on the base, of a detachable lever at the end of the clamp, for bending the axle on the clamp, a removable forming block on the base adjacent to the clamp and a detachable lever in proximity to the removable block, for bending the axle thereon, substantially as described.

2. In a machine for bending crank axles, the combination of the base, the fixed forming clamps, for rigidly holding the axle the lever for bending the ends of the shaft upon the clamps, a removable forming block having pins adapted to detachably engage in apertures in the base, and a bending lever adapted to be pivoted to the block to bend the end of the shaft about the block, substantially as described.

3. In a machine for forming cranks, the combination of a shaft having a wheel centrally secured thereto, a base centrally apertured to receive the wheel, clamps at each side of the aperture adapted to engage the shaft, a lever adapted to be pivoted in the base and having a roller to bear against the shaft in bending the same, a detachable forming block having pins adapted to engage in apertures in the base and the bending-lever having a roller bearing adapted to be pivoted on the block and to engage the end of the shaft to bend it about the block, substantially as described.

4. In a machine for bending cranks, the combination of the block O, of the pin T extending from its upper face, the lever R, having a bearing adapted to engage said pin, the arm R' at the end of the lever and the roller bearing U, substantially as described.

In testimony whereof I affix my signature in presence of two witnesses.

PETER GENDRON.

Witnesses:
M. B. O'DOGHERTY,
N. L. LINDOP.